US006826329B2

(12) United States Patent
Imada

(10) Patent No.: US 6,826,329 B2
(45) Date of Patent: Nov. 30, 2004

(54) PLASTIC OPTICAL FIBER WITH A LENS, LIGHT-EMITTING/RECEIVING APPARATUS WITH THE PLASTIC OPTICAL FIBER WITH A LENS, AND METHOD OF FABRICATING THE PLASTIC OPTICAL FIBER WITH A LENS

(75) Inventor: Aya Imada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 09/817,141

(22) Filed: Mar. 27, 2001

(65) Prior Publication Data

US 2001/0028761 A1 Oct. 11, 2001

(30) Foreign Application Priority Data

Apr. 5, 2000 (JP) ........................................ 2000-102900

(51) Int. Cl.[7] ................................................ G02B 6/32
(52) U.S. Cl. ........................................................ 385/35
(58) Field of Search ............................. 385/33–35, 93, 385/88–90, 94, 79, 147, 91, 36; 359/900, 819; 250/227.11

(56) References Cited

U.S. PATENT DOCUMENTS 4,989,943 A * 2/1991 Yoshinaga et al. ....... 350/96.18
5,666,450 A * 9/1997 Fujimura et al. ............. 385/93
5,778,124 A * 7/1998 Nedstedt ...................... 385/79
6,206,582 B1 * 3/2001 Gilliland ...................... 385/92
6,396,981 B1 * 5/2002 Won et al. .................... 385/35

FOREIGN PATENT DOCUMENTS

| EP | 0 862 070 | 9/1998 | | |
|----|-----------|--------|---|---|
| JP | 56-33606 | * 4/1981 | ................. | 385/35 |
| JP | 61-59303 | 3/1986 | | |
| JP | 62-57001 | 3/1987 | | |
| JP | 62-57001 | 11/1987 | | |
| JP | 05-107427 | 4/1993 | | |
| JP | 08-75935 | 3/1996 | | |
| JP | 10-239538 | 9/1998 | | |
| JP | 11-242129 | 9/1999 | | |
| JP | 11-326689 | 11/1999 | | |

* cited by examiner

*Primary Examiner*—J. F. Duverne
(74) *Attorney, Agent, or Firm*—Fitzpatrick, Cella, Harper & Scinto

(57) ABSTRACT

A plastic optical fiber with a lens of the present invention includes a plastic optical fiber including a core and a cladding, and a lens having a function of controlling light rays. The lens is formed of a material with a thermally-softening temperature higher than a thermally-softening temperature of the core of the plastic optical fiber, and the lens is integrated with the plastic optical fiber by heating and pressing the lens against an end face of the plastic optical fiber.

6 Claims, 2 Drawing Sheets

PLASTIC OPTICAL FIBER WITH A LENS, LIGHT-EMITTING/RECEIVING APPARATUS WITH THE PLASTIC OPTICAL FIBER WITH A LENS, AND METHOD OF FABRICATING THE PLASTIC OPTICAL FIBER WITH A LENS

BACKGROUND OF THE INVENTION

1. Field of the Invention

The present invention relates to a plastic optical fiber with a lens in which the lens having a light-condensing function or the like is integrally attached to the end face of the optical fiber, a light-emitting/receiving apparatus (this term means a light-emitting apparatus or a light-receiving apparatus in this specification) in which a light-emitting/receiving device (this term means a light-emitting device (such as a laser diode) or a light-receiving device (such as a photodiode) in this specification) is combined with the plastic optical fiber with a lens, and a method of fabricating the plastic optical fiber with a lens.

2. Related Background Art

Conventionally, in order to enhance the coupling efficiency between plastic optical fibers, or a plastic optical fiber and a light-emitting device/receiving device, there have been proposed some methods of forming a convex lens at the end face of the plastic optical fiber. For example, Japanese Patent Application Laid-Open No. 10 (1998)-239538 discloses a method of forming a spherical convex contour on the end face of a plastic optical fiber by using a solvent, Japanese Patent Application Laid-Open No. 11 (1999)-326689 discloses a method of forming a spherical convex contour on the end face of a plastic optical fiber by immersing the end thereof in an organic solvent containing an optical fiber material and drying this end face after the optical fiber is lifted from the solvent, Japanese Patent Application Laid-Open No. 5 (1993)-107427 discloses a method of forming a spherical convex contour on the end face of an optical fiber by immersing the end thereof in a photosensitive resin and hardening this end face after the optical fiber is lifted from the resin, Japanese Patent Application Laid-Open No. 8 (1996)-75935 discloses a method of forming a lens shape on the end face of an optical fiber by pressing the end face thereof on a heated lens forming mold, and Japanese Patent Publication No. 62 (1987)-57001 discloses a method of forming a spherical convex surface on the end face of an optical fiber by heating and softening this end face, using surface tension.

Further, there have been proposed, as an art of fabricating a concave contour on the end face of a plastic optical fiber with a refractive index distribution, a method of molding the end face of an optical fiber by a heated metal mold, and a method of forming a concave contour on the end face of an optical fiber by applying a solvent (see Japanese Patent Application Laid-Open No. 11 (1999)-242129).

In those conventional methods, however, precision in centering a light-condensing axis of the spherical convex surface is not sufficiently satisfactory, and alignment between the light-emitting/receiving device and the optical fiber needs to be additionally conducted after the optical fiber is fabricated. Moreover, since the end face of the optical fiber has a spherical convex contour, tolerance of its positional deviation is small, compared to an optical fiber with a flat end face.

SUMMARY OF THE INVENTION

It is an object of the present invention to provide a plastic optical fiber with a lens, in which the lens having a light-condensing function or the like is integrally attached to an end face of the optical fiber and which has an excellent reproducibility, its fabrication method, a light-emitting/receiving apparatus in which a light-emitting/receiving device is combined with the plastic optical fiber with a lens, and its fabrication method. The plastic optical fiber refers to an optical fiber whose core and cladding are made of polymer, and an optical fiber whose core is made of polymer. In such a plastic optical fiber, the cladding may be covered with a protective layer, or a polymer jacket. Further, the plastic optical fiber may be a step-index (SI) type wherein a refractive index along its radial direction is uniform throughout but exhibits an abrupt step at its core-cladding interface, a graded-index (GI) type wherein a refractive index varies in some continuous fashion as a function of radial distance, or the like.

The present invention is generally directed to a plastic optical fiber with a lens, which includes a plastic optical fiber having a core and a cladding, and a lens having a function of controlling light rays. The lens is formed of a material with a thermally-softening temperature higher than a thermally-softening temperature of the core of the plastic optical fiber, and the lens is integrated with the plastic optical fiber by heating and pressing the lens against an end face of the plastic optical fiber.

In the plastic optical fiber with a lens of the present invention, the lens is heated to a temperature below the thermally-softening temperature of the lens and above the thermally-softening temperature of the core of the plastic optical fiber, and the end face of the plastic optical fiber is molded and integrated with the lens by using the heated lens as a mold. The end face of the plastic optical fiber is preferably cut by a cutter and shaped into a flat surface. Further, after the end face of the plastic optical fiber is molded and integrated with the lens, it is preferable to surely bond the lens to the plastic optical fiber with an adhesive.

On the basis of the above structure, the following more specific structures are possible.

Any lens can be used as far as the lens has a function of controlling light rays. Typically, the lens is a light-condensing lens with a spherical surface (e.g., a ball lens), or a light-condensing lens with a semispherical surface. The semispherical lens can be typically attached to the end face of the optical fiber by pressing the semispherical face against the end face of the optical fiber. In this case, an outer face of the optical fiber with the semispherical lens becomes flat, and therefore, the optical fiber can be readily handled. Other lenses, such as a cylindrical graded-index lens, a convex or concave meniscus lens, and an aspherical lens, can be used according to applications.

The lens is typically formed of glass or resin whose thermally-softening temperature is relatively high. The plastic optical fiber is typically a totally-fluorine-contained plastic optical fiber or the like.

It is preferable that the lens have a diameter smaller than a diameter of the plastic optical fiber, and be bonded to the plastic optical fiber at its peripheral portion with an adhesive.

Further, the present invention is generally directed to a method of fabricating a plastic optical fiber with a lens, which includes a step of preparing a thermally-conductive substrate for holding a lens in a predetermined position, a step of heating the substrate and the lens held thereby to a temperature below a thermally-softening temperature of the lens and above a thermally-softening temperature of a core of a plastic optical fiber, and a step of pressing an end face of the plastic optical fiber against the heated lens and molding the end face of the plastic optical fiber to integrate the lens with the plastic optical fiber and cause an end of the plastic optical fiber to have a function of controlling light rays (e.g., a light-condensing function).

On the basis of the above method, the following more specific methods are possible.

A portion with a contour for holding the lens in the predetermined position can be formed directly (see an example of FIG. 6) or indirectly (see an example of FIG. 1) on the thermally-conductive substrate.

An adjusting surface for adjusting a positional relationship in an optical-axial direction between the lens and the plastic optical fiber can also be formed near the portion with a contour for holding the lens, and a periphery of the end face of the plastic optical fiber can be caused to abut the adjusting surface when the end face of the plastic optical fiber is pressed against the heated lens.

An alignment member for holding an end portion of the plastic optical fiber and aligning optical axes of the lens and the plastic optical fiber with each other can be provided on the substrate, and the optical axes of the lens and the plastic optical fiber can be caused to align with each other when the end face of the plastic optical fiber is pressed against the heated lens.

Furthermore, the present invention is generally directed to a light-emitting/receiving apparatus which includes a light-emitting/receiving device arranged on a substrate, and the above-discussed plastic optical fiber with a lens of the present invention. The lens is held above the light-emitting/receiving device.

On the basis of the above structure, the following more specific structures are possible.

The lens can have a diameter smaller than a diameter of the plastic optical fiber, the portion for holding the lens can be a recess whose size is larger than the diameter of the lens and smaller than the diameter of the plastic optical fiber, and the adjusting surface can be a surface around the recess.

The portion for holding the lens can be formed integrally with and of a material common to the lens (see an example of FIG. 8).

An alignment member for holding an end portion of the plastic optical fiber and aligning optical axes of the lens and the plastic optical fiber with each other can be provided on the substrate. In this case, the plastic optical fiber can be bonded to the alignment member with an adhesive at its periphery.

Furthermore, the present invention is generally directed to a method of fabricating a light-emitting/receiving apparatus, which includes a step of preparing a thermally-conductive substrate for arranging a light-emitting/receiving device and holding a lens in predetermined positions, respectively, a step of arranging the light-emitting/receiving device in the predetermined position on the substrate, a step of holding the lens in the predetermined position on the substrate, a step of heating the substrate and the lens held thereby to a temperature below a thermally-softening temperature of the lens and above a thermally-softening temperature of a core of a plastic optical fiber, and a step of pressing an end face of the plastic optical fiber against the heated lens and molding the end face of the plastic optical fiber to integrate the lens with the plastic optical fiber and cause an end of the plastic optical fiber to have a function of controlling light rays.

In the method of fabricating the light-emitting/receiving apparatus, the lens is appropriately positioned above the a light-emitting/receiving device arranged on the substrate. Thereafter, the lens is heated to the above temperature, and the end face of the plastic optical fiber is pressed against the heated lens and molded thereby to integrate the lens with the plastic optical fiber. Finally, the plastic optical fiber may be assuredly fixed to the lens with an adhesive or the like. This method is substantially the same as the above-discussed method of fabricating a plastic optical fiber with a lens of this invention.

Here, the position of the lens above the light-emitting/receiving device and alignment between the lens and the plastic optical fiber in integrating the plastic optical fiber with the lens are important. For example, when the diameter of the lens is smaller than that of the plastic optical fiber, a layer with a recess of a size larger than the lens and smaller than the optical fiber is provided on the substrate to align the light-emitting/receiving device with the lens and adjust the distance in an optical-axial direction between the lens and the optical fiber. Further, a layer for holding the optical fiber and aligning the optical fiber with the lens and the light-emitting/receiving device may be formed on the layer with a recess in order to achieve all-directional alignment between light-emitting/receiving device, lens and plastic optical fiber.

These and other advantages will be more readily understood in connection with the following detailed description of the more preferred embodiments in conjunction with the drawings.

DESCRIPTION OF THE PREFERRED EMBODIMENTS

First Embodiment

A first embodiment is directed to a method of fabricating a plastic optical fiber integrated with a light-condensing lens.

Figure 1:
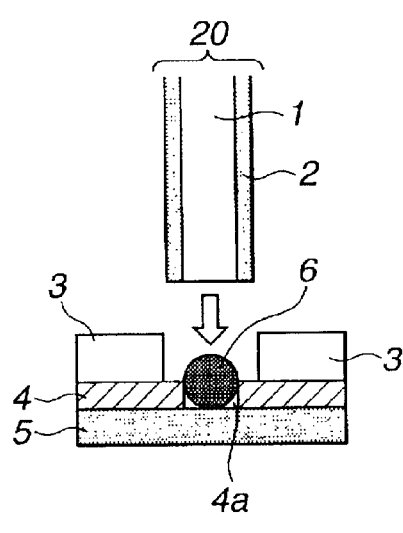
FIG. 1 is a cross-sectional view illustrating a step of a first embodiment of a method of fabricating a plastic optical fiber with a lens according to the present invention.

The plastic optical fiber with a light-condensing lens is fabricated in the following manner. Initially, as illustrated in FIG. 1, a holding layer 4 for holding a light-condensing lens 6 and an alignment layer 3 for holding and aligning a plastic optical fiber 20 including a core 1 and a cladding 2 are formed on a thermally-conductive substrate 5, and the lens 6 is positioned in a hole 4a of the holding layer 4. The substrate 5 is typically made of metal, or glass, that has a high thermally-softening temperature. Each of the holding layer 4 and the alignment layer 3 is made of a material, such as fluorine-contained polymers, which has a low thermal conductivity. The holding layer 4 (particularly, its thickness) also acts as a member for adjusting the distance in an optical-axial direction between the optical fiber 20 and the lens 6.

Figure 2:
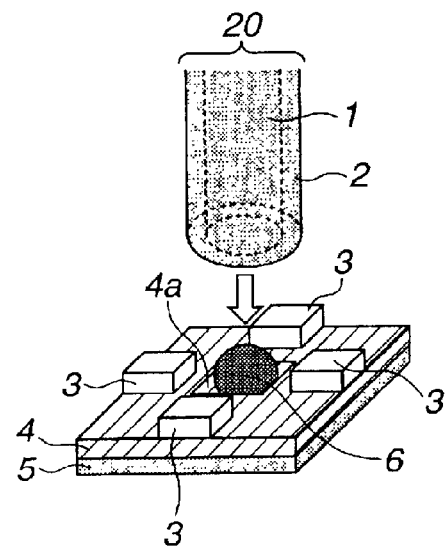
FIG. 2 is a perspective view of FIG. 1.
Figure 4:
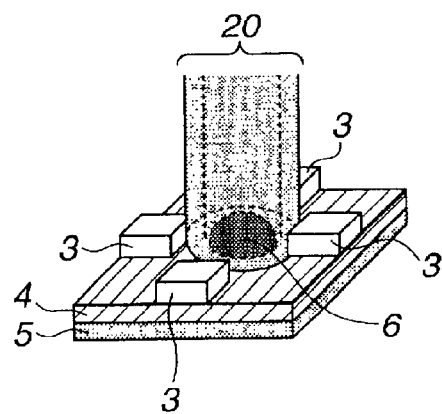
FIG. 4 is a perspective view of FIG. 3.

In the first embodiment, concrete configurations of the layers 3 and 4 are formed as illustrated in FIGS. 2 and 4, and the light-condensing lens 6 has a spherical shape (i.e., a ball lens). The holding layer 4 has a predetermined thickness, and has the square hole 4a for fixing the lens 6. The alignment layer 3 includes four square portions arranged around the hole 4a in an equiangular manner on the holding layer 4.

In this embodiment, the light-condensing lens 6 is formed of a material (e.g., glass, or fluorine-contained polymers) whose thermally-softening temperature is higher than that of the core 1. Naturally the thermally-softening temperature of the lens 6 can also be set above the core 1 and the cladding 2 of the plastic optical fiber. The plastic optical fiber 20 is selected from a totally-fluorine-contained plastic optical fiber, a polymethylemethacrylate (PMMA) plastic optical fiber, and so on. The cladding 2 of the plastic optical fiber 20 may be formed of a material other than a polymer. Further, an acrylic protective layer can be formed around the cladding 2.

Figure 3:
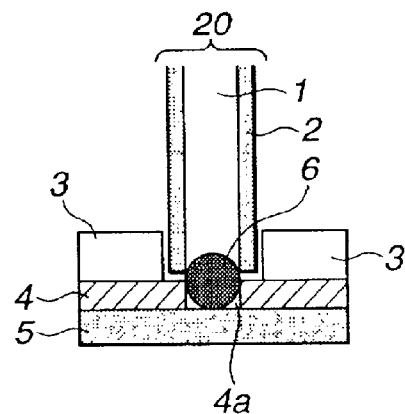
FIG. 3 is a cross-sectional view illustrating another step of the first embodiment.

Then, a portion including the lens 6 is heated by the thermally-conductive substrate 5 to a temperature (preferably, around 160° C.) below the thermally-softening temperature of the lens 6 and above the thermally-softening temperature of the optical fiber 20, and the plastic optical fiber 20 is inserted into the heated lens 6 and molded thereby using the lens 6 as a spherical convex mold, as illustrated in FIGS. 3 and 4. Here, alignment between the optical fiber 20 and the optical axis of the lens 6 is achieved by four square pieces of the alignment layer 3, and adjustment of the distance in an optical-axial direction between the optical fiber 20 and the lens 6 is achieved by an upper surface of the holding layer 4 around the hole 4a, on which a peripheral end face of the optical fiber 20 is caused to abut.

Figure 5:
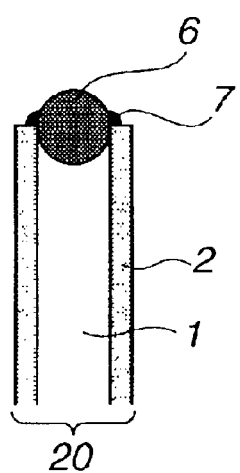
FIG. 5 is a cross-sectional view illustrating a plastic optical fiber with a lens of the present invention fabricated by the first embodiment.

Thereafter, the temperature of the thermally-conductive substrate 5 is lowered to about 80° C., and the plastic optical fiber 20 is lifted. The light-condensing lens 6 is separated from the substrate 5 together with the optical fiber 20, due to an adsorptive power of the resin of the optical fiber. Then, as illustrated in FIG. 5, an adhesive 7, such as an epoxy resin, is put on a peripheral portion of the lens 6, whose position does not interfere with an optical path, to completely fix the lens 6 to the optical fiber 20. The plastic optical fiber 20 with the light-condensing lens 6 affixed to the end face of the optical fiber 20 is thus obtained.

Second Embodiment

Figure 6:
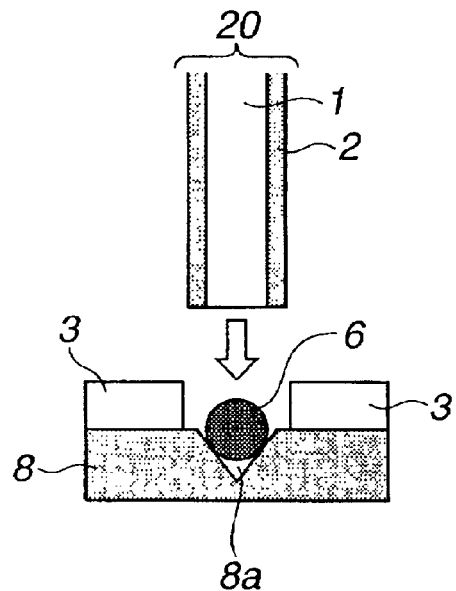
FIG. 6 is a cross-sectional view illustrating a step of a second embodiment of a method of fabricating a plastic optical fiber with a lens according to the present invention.

A second embodiment directed to another method of fabricating a plastic optical fiber with a light-condensing lens is illustrated in FIG. 6.

In the second embodiment, a thermally-conductive substrate 8 has a hole 8a for holding a light-condensing lens 6. The hole 8a is typically a conical hole which has an appropriate depth and an appropriate apex angle corresponding to the diameter of the lens 6. The hole 8a may have a triangular prism shape whose side face is a square shape (an upper opening of the hole 8a) and whose bottom face is a triangular shape (this face appears in FIG. 6).

In the second embodiment, the holding layer 4 used in the first embodiment is not used. On the other hand, an alignment layer 3 includes four portions arranged around the hole 8a in an equiangular manner on the substrate 8, similarly to the first embodiment. With respect to other points, the second embodiment is substantially the same as the first embodiment.

Third Embodiment

A third embodiment is directed to a light emitting/receiving apparatus in which a light emitting/receiving device arranged on a substrate is optically coupled to a plastic optical fiber with a light-condensing lens of this invention.

Figure 7:
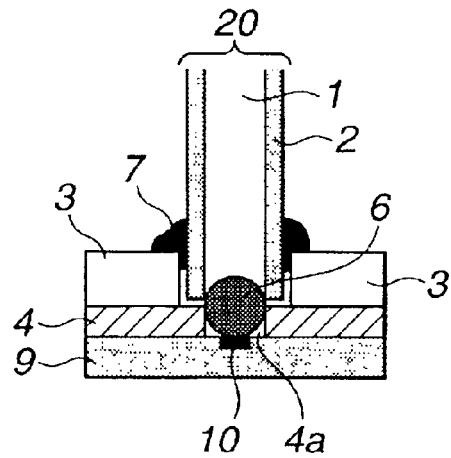
FIG. 7 is a cross-sectional view illustrating a third embodiment of a light-emitting/receiving apparatus according to the present invention.

The third embodiment can be fabricated in the following manner. As illustrated FIG. 7, a holding layer 4 for holding a spherical light-condensing lens 6 and an alignment layer 3 for holding and aligning a plastic optical fiber 20 are formed on a substrate 9, and the condensing lens 6 and a light emitting/receiving device 10 are arranged in a hole 4a of the holding layer 4 and on the substrate 9, respectively. The holding layer 4 (particularly, its thickness) also acts as a member for adjusting the distance in an optical-axial direction between the optical fiber 20 and the lens 6, similarly to the first embodiment.

Here, the light emitting/receiving device 10 and a solder for bonding the device 10 to the substrate 9 (a central portion in the hole 4a) preferably have a heat resistance up to about 200° C. Configurations of the holding layer 4 and the alignment layer 3 of the second embodiment are substantially the same as those of the first embodiment. The positional relationship between the device 10 and the lens 6 is appropriately determined according to the individual case.

Then, a portion including the light-condensing lens 6 is heated to a temperature (preferably, around 160° C.) below the thermally-softening temperature of the lens 6 and above the thermally-softening temperature of the optical fiber 20, and the plastic optical fiber 20 is inserted into the heated lens 6 and molded thereby using the lens 6 as a spherical convex mold, similarly to the first embodiment. Thereafter, the temperature of the thermally-conductive substrate 9 is lowered to about 80° C., and the plastic optical fiber 20 is bonded to the substrate 9 and the alignment layer 3 with an adhesive 7 provided around the optical fiber 20.

Alignment between the optical fiber 20, the lens 6 and the light emitting/receiving device 10 is all achieved by the alignment layer 3 and the holding layer 4. A lens formation on the end face of the optical fiber 20 can be achieved with good yield by using the precisely-formed light-condensing lens 6.

Fourth Embodiment

A fourth embodiment is directed to another light emitting/receiving apparatus in which a light emitting/receiving device arranged on a substrate is optically coupled to a plastic optical fiber with a light-condensing lens of this invention.

Figure 8:
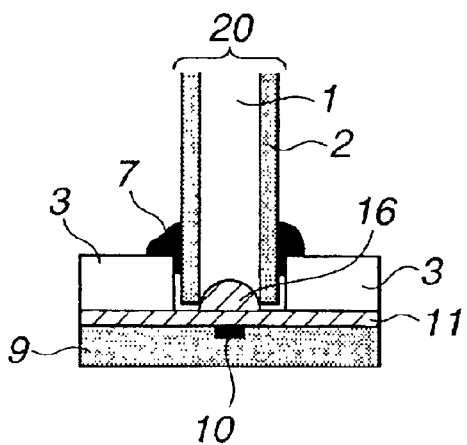
FIG. 8 is a cross-sectional view illustrating a fourth embodiment of a light-emitting/receiving apparatus according to the present invention.

The fourth embodiment can be fabricated in the following manner. As illustrated FIG. 8, a layer 11 with a semispherical lens portion 16 and an alignment layer 3 for holding and aligning a plastic optical fiber 20 are formed on a substrate 9. The layer 11 with the semispherical lens portion 16 is formed by molding a resin, for example. A light emitting/receiving device 10 is arranged on the substrate 9 under a central portion of the semispherical lens portion 16. The layer 11 (particularly, its thickness around the semispherical lens portion 16) also acts as a member for adjusting the distance in an optical-axial direction between the optical fiber 20 and the lens portion 16. Here, the layer 11 with the semispherical lens portion 16 preferably has a heat resistance up to about 200° C.

Then, a portion including the condensing lens portion 16 is heated, and the plastic optical fiber 20 is inserted into the heated condensing lens portion 16 and molded thereby. Thereafter, the plastic optical fiber 20 is bonded to the layer 11 and the alignment layer 3 with an adhesive 7 provided around the optical fiber 20.

As described in the foregoing, in a plastic optical fiber with a lens of the present invention, formation of a plastic optical fiber itself used therein, and connection between the plastic optical fiber and the lens are easy, and hence, the plastic optical fiber with a lens of the present invention, such as a spherically-lensed plastic optical fiber, can be fabricated with good reproducibility. Further, in a light emitting/receiving apparatus of the present invention, connection and alignment between a plastic optical fiber with a lens and a light emitting/receiving device can be readily achieved with a small number of fabrication processes.

While the present invent ion has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A method of fabricating an apparatus, said method comprising the steps of:

preparing a thermally-conductive substrate for arranging in a predetermined position a light-emitting device or a light-receiving device, and for holding a lens in a predetermined position on the substrate;

arranging the device in the predetermined position on the substrate;

holding the lens in the predetermined position on the substrate;

heating the substrate and the lens held thereby to a temperature below a thermally-softening temperature of the lens and above a thermally-softening temperature of a core of a plastic optical fiber; and pressing an end face of the plastic optical fiber against the heated lens to embed at least a part of the lens in the end face of the plastic optical fiber and cause an end of the plastic optical fiber to have a function of controlling light rays.

2. The method of fabricating an apparatus according to claim 1, wherein in said preparing step the thermally-conductive substrate is prepared such that a portion for holding the lens in the predetermined position is formed directly or indirectly on the thermally-conductive substrate.

3. The method of fabricating an apparatus according to claim 2, wherein in said preparing step the thermally-conductive substrate is prepared such that an adjusting surface for adjusting a positional relationship in an optical-axial direction between the lens and the plastic optical fiber is also formed near the portion for holding the lens, and, in said pressing step, a periphery of the end face of the plastic optical fiber is caused to abut the adjusting surface when the lens is embedded in the end face of the plastic optical fiber.

4. The method of fabricating an apparatus according to claim 1, further comprising the step of providing an alignment member for holding an end portion of the plastic optical fiber and aligning optical axes of the lens and the plastic optical fiber with each other on the substrate, wherein the optical axes of the lens and the plastic optical fiber are caused to align with each other when the lens is embedded at the end face of the plastic optical fiber in said pressing step.

5. The method of fabricating an apparatus according to claim 1, wherein the lens held in said holding step has a diameter smaller than a diameter of the plastic optical fiber.

6. The method of fabricating an apparatus according to claim 1, further comprising the step of bonding the lens to the plastic optical fiber at a peripheral portion of the lens with an adhesive.

* * * * *